United States Patent
Wang et al.

(10) Patent No.: US 12,285,889 B1
(45) Date of Patent: Apr. 29, 2025

(54) PREPARATION METHOD OF GLOVE HAVING SOFT COATING WITH HIGH WEAR RESISTANCE AND HIGH ANTI-SLIP PERFORMANCE

(71) Applicant: Jiangsu Hanvo Safety Product Co., Ltd, Nantong (CN)

(72) Inventors: Peng Wang, Nantong (CN); Yugang Wang, Nantong (CN); Xianhua Wang, Nantong (CN); Azfar Akbar, Germantown, TN (US)

(73) Assignee: Jiangsu Hanvo Safety Product Co., Ltd, Nantong (CN)

( * ) Notice: Subject to any disclaimer, the term of this patent is extended or adjusted under 35 U.S.C. 154(b) by 0 days.

(21) Appl. No.: 18/642,848

(22) Filed: Apr. 23, 2024

(30) Foreign Application Priority Data

Jan. 9, 2024 (CN) .......................... 202410029056.3

(51) Int. Cl.
| | |
|---|---|
| *B29C 41/08* | (2006.01) |
| *A41D 19/00* | (2006.01) |
| *B29C 41/00* | (2006.01) |
| *B29C 41/46* | (2006.01) |
| B29L 31/48 | (2006.01) |

(52) U.S. Cl.
CPC .......... *B29C 41/08* (2013.01); *A41D 19/0006* (2013.01); *A41D 19/0096* (2013.01); *B29C 41/003* (2013.01); *B29C 41/46* (2013.01); *B29L 2031/4864* (2013.01)

(58) Field of Classification Search
CPC ....... B29C 41/08; B29C 41/003; B29C 41/46; A41D 19/0006; A41D 19/0096
See application file for complete search history.

(56) References Cited

U.S. PATENT DOCUMENTS

2007/0080480 A1* 4/2007 Tabor .................. C08C 1/04
264/234

FOREIGN PATENT DOCUMENTS

| CN | 106072923 A | 11/2016 |
|---|---|---|
| CN | 109645600 A | 4/2019 |
| CN | 109805475 B | 2/2021 |
| CN | 113698677 A | 11/2021 |
| CN | 114318611 A | 4/2022 |
| CN | 114672082 A | 6/2022 |
| JP | 2022053532 A | 4/2022 |
| KR | 20060113154 A | 11/2006 |

* cited by examiner

*Primary Examiner* — Michael P Wieczorek
(74) *Attorney, Agent, or Firm* — Bayramoglu Law Offices LLC

(57) ABSTRACT

A preparation method of a glove having a soft coating with high wear resistance and high anti-slip performance is provided, including: physically spraying a bio-based organic polymer material on a surface of a glove core coated with an impregnation latex, conducting pre-vulcanization and high-temperature vulcanization successively, washing with an alkali liquor, an acid liquor, and water successively, and oven-drying to obtain the glove having the soft coating with high wear resistance and high anti-slip performance. The present disclosure has the following advantages: The preparation method is simple and reliable, and can greatly increase anti-slip performance and wear resistance of a coating while providing a delicate sand surface effect for the coating. The glove of the present disclosure has excellent anti-slip performance, durability, and comfortability in oily environments and dry environments.

8 Claims, 1 Drawing Sheet

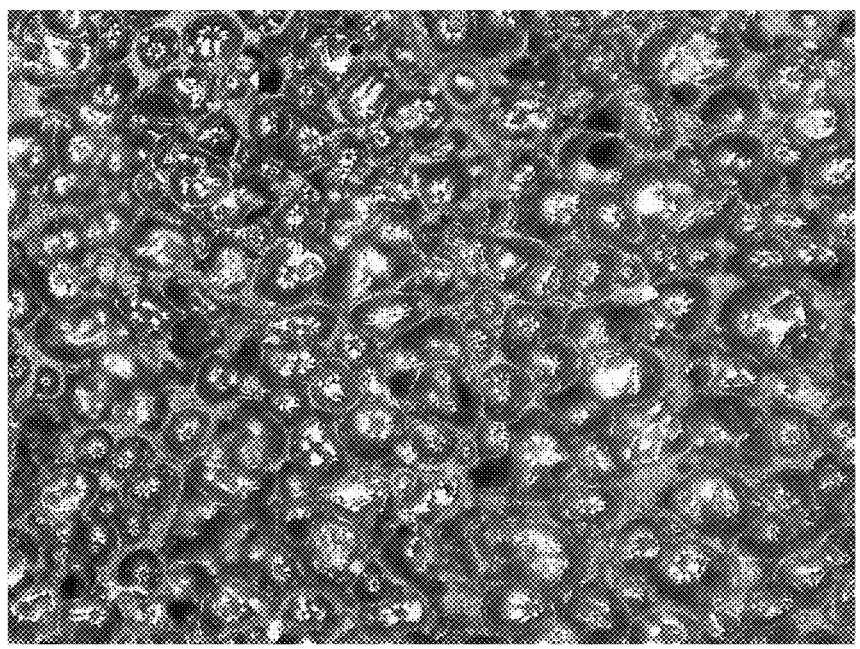

PREPARATION METHOD OF GLOVE HAVING SOFT COATING WITH HIGH WEAR RESISTANCE AND HIGH ANTI-SLIP PERFORMANCE

CROSS REFERENCE TO THE RELATED APPLICATIONS

This application is based upon and claims priority to Chinese Patent Application No. 202410029056.3, filed on Jan. 9, 2024, the entire contents of which are incorporated herein by reference.

TECHNICAL FIELD

The present disclosure relates to the technical field of preparation of gloves, and in particular to a preparation method of a glove having a soft coating with high wear resistance and high anti-slip performance.

BACKGROUND

With the social development, enterprises pay more and more attention to the operational safety of workers, and production operations in oily water environments and dry environments have increasing requirements for grasping and comfort levels. Therefore, there is a great demand for the glove having a soft coating with high anti-slip performance and high wear resistance on the market. Currently, there are a variety of such products on the market, including latex textured glove, latex embossed glove, ultra-fine foaming series glove, and frosted glove. The latex textured/embossed glove has excellent anti-slip ability, but exhibit a poor comfort level in use. In addition, the production process of the latex textured/embossed glove requires an organic solvent with a pungent odor such as xylene, and thus is not eco-friendly. The ultra-fine foaming series glove has an excellent comfort level, but exhibits average anti-slip performance and durability. In addition, the production process of the ultra-fine foaming series glove leads to a large amount of wastewater, and the treatment of the wastewater causes a very high production cost.

SUMMARY

An objective of the present disclosure is to provide a preparation method of the glove having a soft coating with high wear resistance and high anti-slip performance. The preparation method is simple and reliable, and can greatly increase anti-slip performance and wear resistance of a coating while providing a delicate sand surface effect for the coating. The glove of the present disclosure has excellent anti-slip performance, durability, and comfortability in oily environments and dry environments.

The above technical objective of the present disclosure is allowed by the following technical solutions:

The present disclosure provides a preparation method of the glove having a soft coating with high wear resistance and high anti-slip performance, including: physically spraying a bio-based organic polymer material on a surface of a glove core coated with an impregnation latex, conducting pre-vulcanization and high-temperature vulcanization successively, washing with an alkali liquor, an acid liquor, and water successively, and oven-drying to obtain the glove having the soft coating with high wear resistance and high anti-slip performance.

Preferably, the bio-based organic polymer material is selected from one or a mixture of two or more of albumin, globulin, phosphoprotein, and casein; a particle size of the bio-based organic polymer material is less than 50 mesh; and a frequency of a fan for the spraying is 10 Hz to 30 Hz.

Preferably, the pre-vulcanization is conducted at 70° C. to 90° C. for 90 min, and the high-temperature vulcanization is conducted at 110° C. to 140° C. for 90 min.

Preferably, the alkali liquor used for alkali-washing is selected from one of a NaOH solution or a KOH solution, a mass fraction of the alkali liquor is 1% to 5%, and the alkali-washing is conducted for 45 min to 70 min; the acid liquor used for acid-washing is an acetic acid solution with a mass fraction of 1% to 5%, and the acid-washing is conducted for 45 min to 70 min; after the acid-washing, water-washing is conducted twice for 60 min; and the oven-drying is conducted at 90° C.

Preferably, the impregnation latex includes the following raw materials in parts by weight: 70 parts to 100 parts of an acrylonitrile-butadiene latex, 15 parts to 20 parts of a styrene-butadiene latex, 7 parts to 10 parts of a waterborne polyurethane (PU), 0.5 parts to 0.8 parts of KOH, 1 part to 2 parts of a surfactant, 2 parts to 3 parts of a foaming agent, 1 part to 3 parts of sulfur, 2 parts to 4 parts of an accelerating agent, 1 part to 3 parts of zinc oxide, 1 part to 3 parts of titanium dioxide, 3 parts to 5 parts of a film-forming agent, 4 parts to 5 parts of an antioxidant, 7 parts to 10 parts of a crosslinking agent, 4 parts to 5 parts of a biological compound enzyme, 1 part to 3 parts of a black pigment, and 1 part to 4 parts of a thickening agent.

Preferably, the surfactant is selected from one of polyoxyethylene, polyoxypropylene, sodium tripolyphosphate, or sodium sulfate; the foaming agent is selected from one of an azo compound, a sulfonyl hydrazide, or a nitroso compound; the accelerating agent is selected from one of a thiazole accelerating agent, a sulfenamide accelerating agent, a thiuram accelerating agent, a dithiocarbamate accelerating agent, a guanidine accelerating agent, or a xanthate accelerating agent; the film-forming agent is selected from one of a polymer resin, an acrylic resin, or nitrocellulose; the antioxidant is selected from one of an amine antioxidant, a phenol antioxidant, or a heterocycle antioxidant; the crosslinking agent is selected from one of a phenolic resin, an epoxy resin, or polyvinyl alcohol; the biological compound enzyme is selected from one of amylase, protease, lipase, phytase, cellulase, or glucanase; and the thickening agent is selected from one of sodium carboxymethyl cellulose, propylene glycol alginate, sodium carboxymethyl starch, hydroxypropyl starch ether, sodium starch phosphate, acetylated distarch phosphate, phosphated distarch phosphate, or hydroxypropyl distarch phosphate.

Preferably, a preparation method of the glove core coated with the impregnation latex specifically includes:

S1, mixing and stirring raw materials for the impregnation latex to obtain the impregnation latex;

S2, sleeving a glove core on a hand mold, and preheating the glove core at 50° C. to 80° C.; S3, impregnating a preheated glove core with a coagulating agent;

S4, after impregnating with the coagulating agent for 60 s to 80 s, impregnating back, top, front, and bottom sides of a coagulating agent-impregnated glove core with the impregnation latex; and S5, after impregnating with the impregnation latex, spinning for 50 s to 80 s.

Preferably, the coagulating agent is a mixed solution of acetic acid and methanol, and a volume fraction of the acetic acid in the mixed solution is 3% to 10%.

The present disclosure also provides the glove having the soft coating with high wear resistance and high anti-slip performance prepared by the preparation method described above. In summary, the present disclosure has the following beneficial effects:

1. In the present disclosure, a bio-based organic polymer material such as albumin, globulin, phosphoprotein, and casein is adopted to enhance a friction and a strength of a coating. The bio-based organic polymer material has characteristics such as small density and high strength, and can be evenly dispersed on a surface of a coating when spray-coated. During a vulcanization treatment, the bio-based polymer material can fully undergo a carbonyl-amino reaction with carbonyl and amino compounds in the impregnation latex, such that macromolecules are polymerized densely, which can improve physical properties such as wear resistance and anti-slip performance of a coating.

2. The bio-based organic polymer material in the present disclosure reacts with amino and isocyanato in the impregnation latex to produce a urea compound. A mechanism of the reaction can be divided into the following two steps: S1: the amino attacks isocyano in an isocyanate to produce an amine-like intermediate, and S2: the intermediate reacts with another isocyanate molecule to produce the urea compound. The urea compound can effectively fill voids among rubber (coating) molecules to improve the wear resistance and tear resistance of the coating. The urea compound can also improve the heat resistance of the rubber, thereby improving the stability and elasticity of the rubber in a high-temperature environment. In addition, a protein (keratin) in the bio-based organic polymer material left on a surface of the coating has excellent compatibility, and can tightly bind to a coating material through an intramolecular interaction during a coating process, which can greatly improve the wear resistance of the coating without causing any irritation to the skin.

3. Hydroxymethyl in the crosslinking agent used in the present disclosure can undergo an addition reaction with a double bond in the rubber, such as carboxyl. This reaction can improve a crosslinking strength of the rubber, and provide excellent physical properties. The carboxyl can also react with a functional group —N=C=N— (Carbodilite) on an impregnated substrate to improve the adhesion of the rubber to the impregnated substrate and make the coating durable. The antioxidant is added to form a protective film on a surface of the rubber. An active ingredient of the antioxidant can react with an oxygen molecule on a surface of the rubber to form the protective film. The protective film has strong oxidation resistance, and can prevent the further erosion of oxygen molecules to delay an aging process of the rubber. The biological compound enzyme can remove the residual bio-based organic polymer material on a surface of the coating during the production process, such that only a high-strength film layer is retained on the surface of the coating to significantly improve the wear resistance of the coating.

BRIEF DESCRIPTION OF THE DRAWINGS

FIGURE shows a microstructure of a surface layer of the glove prepared in the present disclosure.

DETAILED DESCRIPTION OF THE EMBODIMENTS

The specific implementations of the present disclosure are further described below with reference to an accompanying drawing, which is not intended to limit the present disclosure.

Example 1

In this example, a glove having a soft coating with high wear resistance and high anti-slip performance was provided. A preparation method of the glove included the following steps:

S1, An impregnation latex was prepared from the following raw materials in parts by weight: 70 parts of an acrylonitrile-butadiene latex, 15 parts of a styrene-butadiene latex, 10 parts of a waterborne PU, 0.5 parts of KOH, 1 part of polyoxyethylene as a surfactant, 2 parts of an azo compound as a foaming agent, 1 part of sulfur, 2 parts of a thiazole accelerating agent, 1 part of zinc oxide, 1 part of titanium dioxide, 3 parts of a polymer resin as a film-forming agent, 4 parts of an amine antioxidant, 7 parts of a phenolic resin as a crosslinking agent, 4 parts of amylase, 1 part of a black pigment, and 1 part of sodium carboxymethyl cellulose as a thickening agent.

S2, Preheating: A glove core was sleeved on a hand mold and preheated at 50° C.

S3, Coagulating agent impregnation: A preheated glove core was impregnated with a coagulating agent. The coagulating agent was a mixed solution of acetic acid and methanol, and a volume fraction of the acetic acid in the mixed solution was 3%.

S4, Impregnation latex impregnation: After impregnation with the coagulating agent for 60 s, back, top, front, and bottom sides of a coagulating agent-impregnated glove core were impregnated with the impregnation latex.

S5, Spinning: after impregnation with the impregnation latex, spinning was conducted for 50 s.

S6. Surface treatment: Albumin was physically sprayed with a fan frequency of 10 Hz to form a latex coating.

S7. Pre-vulcanization and high-temperature vulcanization: Pre-vulcanization was conducted at 90° C. for 1.5 h, and high-temperature vulcanization was conducted at 110° C. for 1.5 h.

S8. Demolding: A coated glove core was alkali-washed with a NaOH solution having a mass fraction of 1% for 70 min, acid-washed with an acetic acid solution having a mass fraction of 1% for 70 min, water-washed 2 times for 60 min, and then oven-dried at 90° C. to obtain the glove.

Example 2

In this example, a glove having a soft coating with high wear resistance and high anti-slip performance was provided. A preparation method of the glove included the following steps:

S1, An impregnation latex was prepared from the following raw materials in parts by weight: 70 parts of an acrylonitrile-butadiene latex, 15 parts of a styrene-butadiene latex, 10 parts of a waterborne PU, 0.5 parts of KOH, 1 part of polyoxyethylene as a surfactant, 2 parts of an azo compound as a foaming agent, 1 part of sulfur, 2 parts of a thiazole accelerating agent, 1 part of zinc oxide, 1 part of titanium dioxide, 3 parts of a polymer resin as a film-forming agent, 4 parts of an amine antioxidant, 7 parts of a phenolic resin as a crosslinking agent, 4 parts of amylase, 1 part of a black pigment, and 1 part of sodium carboxymethyl cellulose as a thickening agent.

S2, Preheating: A glove core was sleeved on a hand mold and preheated at 50° C.

S3, Coagulating agent impregnation: A preheated glove core was impregnated with a coagulating agent. The coagulating agent was a mixed solution of acetic acid and methanol, and a volume fraction of the acetic acid in the mixed solution was 3%.

S4, Impregnation latex impregnation: After impregnation with the coagulating agent for 60 s, back, top, front, and bottom sides of a coagulating agent-impregnated glove core were impregnated with the impregnation latex.

S5, Spinning: after impregnation with the impregnation latex, spinning was conducted for 50 s.

S6. Surface treatment: Albumin was physically sprayed with a fan frequency of 15 Hz to form a latex coating.

S7. Pre-vulcanization and high-temperature vulcanization: Pre-vulcanization was conducted at 90° C. for 1.5 h, and high-temperature vulcanization was conducted at 110° C. for 1.5 h.

S8. Demolding: A coated glove core was alkali-washed with a NaOH solution having a mass fraction of 1% for 70 min, acid-washed with an acetic acid solution having a mass fraction of 1% for 70 min, water-washed 2 times for 60 min, and then oven-dried at 90° C. to obtain the glove.

Example 3

In this example, a glove having a soft coating with high wear resistance and high anti-slip performance was provided. A preparation method of the glove included the following steps:

S1, An impregnation latex was prepared from the following raw materials in parts by weight: 70 parts of an acrylonitrile-butadiene latex, 15 parts of a styrene-butadiene latex, 10 parts of a waterborne PU, 0.5 parts of KOH, 1 part of polyoxyethylene as a surfactant, 2 parts of an azo compound as a foaming agent, 1 part of sulfur, 2 parts of a thiazole accelerating agent, 1 part of zinc oxide, 1 part of titanium dioxide, 3 parts of a polymer resin as a film-forming agent, 4 parts of an amine antioxidant, 7 parts of a phenolic resin as a crosslinking agent, 4 parts of amylase, 1 part of a black pigment, and 1 part of sodium carboxymethyl cellulose as a thickening agent.

S2, Preheating: A glove core was sleeved on a hand mold and preheated at 50° C.

S3, Coagulating agent impregnation: A preheated glove core was impregnated with a coagulating agent. The coagulating agent was a mixed solution of acetic acid and methanol, and a volume fraction of the acetic acid in the mixed solution was 3%.

S4, Impregnation latex impregnation: After impregnation with the coagulating agent for 60 s, back, top, front, and bottom sides of a coagulating agent-impregnated glove core were impregnated with the impregnation latex.

S5, Spinning: after impregnation with the impregnation latex, spinning was conducted for 50 s.

S6. Surface treatment: Albumin was physically sprayed with a fan frequency of 20 Hz to form a latex coating.

S7. Pre-vulcanization and high-temperature vulcanization: Pre-vulcanization was conducted at 90° C. for 1.5 h, and high-temperature vulcanization was conducted at 110° C. for 1.5 h.

S8. Demolding: A coated glove core was alkali-washed with a NaOH solution having a mass fraction of 1% for 70 min, acid-washed with an acetic acid solution having a mass fraction of 1% for 70 min, water-washed 2 times for 60 min, and then oven-dried at 90° C. to obtain the glove.

Example 4

In this example, a glove having a soft coating with high wear resistance and high anti-slip performance was provided. A preparation method of the glove included the following steps:

S1, An impregnation latex was prepared from the following raw materials in parts by weight: 85 parts of an acrylonitrile-butadiene latex, 18 parts of a styrene-butadiene latex, 8 parts of a waterborne PU, 0.7 parts of KOH, 2 parts of polyoxypropylene as a surfactant, 3 parts of a sulfonyl hydrazide as a foaming agent, 2 parts of sulfur, 3 parts of a sulfenamide accelerating agent, 2 parts of zinc oxide, 2 parts of titanium dioxide, 4 parts of an acrylic resin as a film-forming agent, 5 parts of a phenol antioxidant, 9 parts of an epoxy resin as a crosslinking agent, 4 parts of protease, 2 parts of a black pigment, and 3 parts of propylene glycol alginate as a thickening agent.

S2, Preheating: A glove core was sleeved on a hand mold and preheated at 50° C.

S3, Coagulating agent impregnation: A preheated glove core was impregnated with a coagulating agent. The coagulating agent was a mixed solution of acetic acid and methanol, and a volume fraction of the acetic acid in the mixed solution was 5%.

S4, Impregnation latex impregnation: After impregnation with the coagulating agent for 60 s, back, top, front, and bottom sides of a coagulating agent-impregnated glove core were impregnated with the impregnation latex.

S5, Spinning: after impregnation with the impregnation latex, spinning was conducted for 50 s.

S6. Surface treatment: Albumin was physically sprayed with a fan frequency of 25 Hz to form a latex coating.

S7. Pre-vulcanization and high-temperature vulcanization: Pre-vulcanization was conducted at 90° C. for 1.5 h, and high-temperature vulcanization was conducted at 110° C. for 1.5 h.

S8. Demolding: A coated glove core was alkali-washed with a NaOH solution having a mass fraction of 3% for 60 min, acid-washed with an acetic acid solution having a mass fraction of 3% for 60 min, water-washed 2 times for 60 min, and then oven-dried at 90° C. to obtain the glove.

Example 5

In this example, a glove having a soft coating with high wear resistance and high anti-slip performance was provided. A preparation method of the glove included the following steps:

S1, An impregnation latex was prepared from the following raw materials in parts by weight: 85 parts of an acrylonitrile-butadiene latex, 18 parts of a styrene-butadiene latex, 8 parts of a waterborne PU, 0.7 parts of KOH, 2 parts of polyoxypropylene as a surfactant, 3 parts of a sulfonyl hydrazide as a foaming agent, 2 parts of sulfur, 3 parts of a sulfenamide accelerating agent, 2 parts of zinc oxide, 2 parts of titanium dioxide, 4 parts of an acrylic resin as a film-forming agent, 5 parts of a phenol antioxidant, 9 parts of an epoxy resin as a crosslinking agent, 4 parts of protease, 2 parts of a black pigment, and 3 parts of propylene glycol alginate as a thickening agent.

S2, Preheating: A glove core was sleeved on a hand mold and preheated at 50° C.

S3, Coagulating agent impregnation: A preheated glove core was impregnated with a coagulating agent. The coagulating agent was a mixed solution of acetic acid and methanol, and a volume fraction of the acetic acid in the mixed solution was 5%.

S4, Impregnation latex impregnation: After impregnation with the coagulating agent for 60 s, back, top, front, and bottom sides of a coagulating agent-impregnated glove core were impregnated with the impregnation latex.

S5, Spinning: after impregnation with the impregnation latex, spinning was conducted for 50 s.

S6. Surface treatment: Albumin was physically sprayed with a fan frequency of 30 Hz to form a latex coating.

S7. Pre-vulcanization and high-temperature vulcanization: Pre-vulcanization was conducted at 90° C. for 1.5 h, and high-temperature vulcanization was conducted at 110° C. for 1.5 h.

S8. Demolding: A coated glove core was alkali-washed with a NaOH solution having a mass fraction of 3% for 60 min, acid-washed with an acetic acid solution having a mass fraction of 3% for 60 min, water-washed 2 times for 60 min, and then oven-dried at 90° C. to obtain the glove.

Example 6

In this example, a glove having a soft coating with high wear resistance and high anti-slip performance was provided. A preparation method of the glove included the following steps:

S1, An impregnation latex was prepared from the following raw materials in parts by weight: 85 parts of an acrylonitrile-butadiene latex, 18 parts of a styrene-butadiene latex, 8 parts of a waterborne PU, 0.7 parts of KOH, 2 parts of polyoxypropylene as a surfactant, 3 parts of a sulfonyl hydrazide as a foaming agent, 2 parts of sulfur, 3 parts of a sulfenamide accelerating agent, 2 parts of zinc oxide, 2 parts of titanium dioxide, 4 parts of an acrylic resin as a film-forming agent, 5 parts of a phenol antioxidant, 9 parts of an epoxy resin as a crosslinking agent, 4 parts of protease, 2 parts of a black pigment, and 3 parts of propylene glycol alginate as a thickening agent.

S2, Preheating: A glove core was sleeved on a hand mold and preheated at 50° C.

S3, Coagulating agent impregnation: A preheated glove core was impregnated with a coagulating agent. The coagulating agent was a mixed solution of acetic acid and methanol, and a volume fraction of the acetic acid in the mixed solution was 5%.

S4, Impregnation latex impregnation: After impregnation with the coagulating agent for 60 s, back, top, front, and bottom sides of a coagulating agent-impregnated glove core were impregnated with the impregnation latex.

S5, Spinning: after impregnation with the impregnation latex, spinning was conducted for 50 s.

S6. Surface treatment: Globulin was physically sprayed with a fan frequency of 30 Hz to form a latex coating.

S7. Pre-vulcanization and high-temperature vulcanization: Pre-vulcanization was conducted at 90° C. for 1.5 h, and high-temperature vulcanization was conducted at 110° C. for 1.5 h.

S8. Demolding: A coated glove core was alkali-washed with a NaOH solution having a mass fraction of 3% for 60 min, acid-washed with an acetic acid solution having a mass fraction of 3% for 60 min, water-washed 2 times for 60 min, and then oven-dried at 90° C. to obtain the glove.

Example 7

In this example, a glove having a soft coating with high wear resistance and high anti-slip performance was provided. A preparation method of the glove included the following steps:

S1, An impregnation latex was prepared from the following raw materials in parts by weight: 100 parts of an acrylonitrile-butadiene latex, 20 parts of a styrene-butadiene latex, 10 parts of a waterborne PU, 0.8 parts of KOH, 2 parts of sodium tripolyphosphate as a surfactant, 3 parts of a nitroso compound as a foaming agent, 3 parts of sulfur, 4 parts of a dithiocarbamate accelerating agent, 3 parts of zinc oxide, 3 parts of titanium dioxide, 5 parts of nitrocellulose as a film-forming agent, 5 parts of a heterocycle antioxidant, 10 parts of polyvinyl alcohol as a crosslinking agent, 5 parts of cellulase, 3 parts of a black pigment, and 4 parts of phosphated distarch phosphate as a thickening agent.

S2, Preheating: A glove core was sleeved on a hand mold and preheated at 50° C.

S3, Coagulating agent impregnation: A preheated glove core was impregnated with a coagulating agent. The coagulating agent was a mixed solution of acetic acid and methanol, and a volume fraction of the acetic acid in the mixed solution was 10%.

S4, Impregnation latex impregnation: After impregnation with the coagulating agent for 60 s, back, top, front, and bottom sides of a coagulating agent-impregnated glove core were impregnated with the impregnation latex.

S5, Spinning: after impregnation with the impregnation latex, spinning was conducted for 50 s.

S6. Surface treatment: Phosphoprotein was physically sprayed with a fan frequency of 30 Hz to form a latex coating.

S7. Pre-vulcanization and high-temperature vulcanization: Pre-vulcanization was conducted at 90° C. for 1.5 h, and high-temperature vulcanization was conducted at 110° C. for 1.5 h.

S8. Demolding: A coated glove core was alkali-washed with a NaOH solution having a mass fraction of 5% for 45 min, acid-washed with an acetic acid solution having a mass fraction of 5% for 45 min, water-washed 2 times for 60 min, and then oven-dried at 90° C. to obtain the glove.

Example 8

In this example, a glove having a soft coating with high wear resistance and high anti-slip performance was provided. A preparation method of the glove included the following steps:

S1, An impregnation latex was prepared from the following raw materials in parts by weight: 100 parts of an acrylonitrile-butadiene latex, 20 parts of a styrene-butadiene latex, 10 parts of a waterborne PU, 0.8 parts of KOH, 2 parts of sodium tripolyphosphate as a surfactant, 3 parts of a nitroso compound as a foaming agent, 3 parts of sulfur, 4 parts of a dithiocarbamate accelerating agent, 3 parts of zinc oxide, 3 parts of titanium dioxide, 5 parts of nitrocellulose as a film-forming agent, 5 parts of a heterocycle antioxidant, 10 parts of polyvinyl alcohol as a crosslinking agent, 5 parts of cellulase, 3 parts of a black pigment, and 4 parts of phosphated distarch phosphate as a thickening agent.

S2, Preheating: A glove core was sleeved on a hand mold and preheated at 50° C.

S3, Coagulating agent impregnation: A preheated glove core was impregnated with a coagulating agent. The coagulating agent was a mixed solution of acetic acid and methanol, and a volume fraction of the acetic acid in the mixed solution was 10%.

S4, Impregnation latex impregnation: After impregnation with the coagulating agent for 60 s, back, top, front, and bottom sides of a coagulating agent-impregnated glove core were impregnated with the impregnation latex.

S5, Spinning: after impregnation with the impregnation latex, spinning was conducted for 50 s.

S6. Surface treatment: Casein was physically sprayed with a fan frequency of 30 Hz to form a latex coating.

S7. Pre-vulcanization and high-temperature vulcanization: Pre-vulcanization was conducted at 90° C. for 1.5 h, and high-temperature vulcanization was conducted at 110° C. for 1.5 h.

S8. Demolding: A coated glove core was alkali-washed with a NaOH solution having a mass fraction of 5% for 45 min, acid-washed with an acetic acid solution having a mass fraction of 5% for 45 min, water-washed 2 times for 60 min, and then oven-dried at 90° C. to obtain the glove.

Example 9

In this example, a glove having a soft coating with high wear resistance and high anti-slip performance was provided. A preparation method of the glove included the following steps:

S1, An impregnation latex was prepared from the following raw materials in parts by weight: 100 parts of an acrylonitrile-butadiene latex, 20 parts of a styrene-butadiene latex, 10 parts of a waterborne PU, 0.8 parts of KOH, 2 parts of sodium tripolyphosphate as a surfactant, 3 parts of a nitroso compound as a foaming agent, 3 parts of sulfur, 4 parts of a dithiocarbamate accelerating agent, 3 parts of zinc oxide, 3 parts of titanium dioxide, 5 parts of nitrocellulose as a film-forming agent, 5 parts of a heterocycle antioxidant, 10 parts of polyvinyl alcohol as a crosslinking agent, 5 parts of cellulase, 3 parts of a black pigment, and 4 parts of phosphated distarch phosphate as a thickening agent.

S2, Preheating: A glove core was sleeved on a hand mold and preheated at 50° C.

S3, Coagulating agent impregnation: A preheated glove core was impregnated with a coagulating agent. The coagulating agent was a mixed solution of acetic acid and methanol, and a volume fraction of the acetic acid in the mixed solution was 10%.

S4, Impregnation latex impregnation: After impregnation with the coagulating agent for 60 s, back, top, front, and bottom sides of a coagulating agent-impregnated glove core were impregnated with the impregnation latex.

S5, Spinning: after impregnation with the impregnation latex, spinning was conducted for 50 s.

S6. Surface treatment: Phosphoprotein was physically sprayed with a fan frequency of 30 Hz to form a latex coating.

S7. Pre-vulcanization and high-temperature vulcanization: Pre-vulcanization was conducted at 90° C. for 1.5 h, and high-temperature vulcanization was conducted at 110° C. for 1.5 h.

S8. Demolding: A coated glove core was alkali-washed with a NaOH solution having a mass fraction of 5% for 45 min, acid-washed with an acetic acid solution having a mass fraction of 5% for 45 min, water-washed 2 times for 60 min, and then oven-dried at 90° C. to obtain the glove.

Comparative Example 1

In this comparative example, a coated glove was provided. A preparation method of the coated glove included the following steps:

S1, An impregnation latex was prepared from the following raw materials in parts by weight: 70 parts of an acrylonitrile-butadiene latex, 15 parts of a styrene-butadiene latex, 10 parts of a waterborne PU, 0.5 parts of KOH:, 1 part of polyoxyethylene as a surfactant:, 2 parts of an azo compound as a foaming agent, 1 part of sulfur, 2 parts a thiazole accelerating agent, 1 part of zinc oxide, 1 part titanium dioxide, 3 parts of a polymer resin as a film-forming agent, 4 parts of an amine antioxidant, 7 parts of a phenolic resin as a crosslinking agent, 4 parts of amylase, 1 part of a black pigment, and 1 part of sodium carboxymethyl cellulose as a thickening agent.

S2, Preheating: A glove core was sleeved on a hand mold and preheated at 50° C.

S3, Coagulating agent impregnation: A preheated glove core was impregnated with a coagulating agent. The coagulating agent was a mixed solution of acetic acid and methanol, and a volume fraction of the acetic acid in the mixed solution was 3%.

S4, Impregnation latex impregnation: After impregnation with the coagulating agent for 60 s, back, top, front, and bottom sides of a coagulating agent-impregnated glove core were impregnated with the impregnation latex.

S5, Spinning: after impregnation with the impregnation latex, spinning was conducted for 50 s.

S6. Surface treatment: An industrial salt was sprayed with a fan frequency of 30 Hz to form a latex coating.

S7. Pre-vulcanization and high-temperature vulcanization: Pre-vulcanization was conducted at 90° C. for 1.5 h, and high-temperature vulcanization was conducted at 110° C. for 1.5 h.

S8. Demolding: A coated glove core was alkali-washed with a NaOH solution having a mass fraction of 1% for 70 min, acid-washed with an acetic acid solution having a mass fraction of 1% for 70 min, water-washed 2 times for 60 min, and then oven-dried at 90° C. to obtain the glove.

The anti-slip performance of the glove was determined by a dry slip method with a weight of 1.5 kg. A standard unit for the anti-slip performance was kgf. Mechanical properties of the glove were determined by a test method in the European standard EN-388.

The glove prepared in Examples 1 to 9 and Comparative Example 1 each were subjected to mechanical testing analysis. Specific test results are shown in Table 1 below:

TABLE 1

Mechanical testing results for Examples 1 to 9 and Comparative Example 1

| | anti-slip performance | Wear resistance | Tear resistance | Puncture resistance |
| --- | --- | --- | --- | --- |
| Comparative Example 1 | (2.3) LL | (8100 r) grade 4 | Grade 3 | Grade 1 |
| Example 1 | (2.5) LL | (8300 r) grade 4 | Grade 3 | Grade 1 |
| Example 2 | (2.6) LL | (15000 r) grade 4 | Grade 3 | Grade 1 |
| Example 3 | (2.7) LL | (17000 r) grade 4 | Grade 3 | Grade 1 |
| Example 4 | (2.9) LL | (22000 r) grade 4 | Grade 3 | Grade 1 |
| Example 5 | (3.0) LL | (22000 r) grade 4 | Grade 3 | Grade 1 |
| Example 6 | (3.0) LL | (25000 r) grade 4 | Grade 3 | Grade 1 |
| Example 7 | (3.0) LL | (24000 r) grade 4 | Grade 3 | Grade 1 |
| Example 8 | (3.0) LL | (24000 r) grade 4 | Grade 3 | Grade 1 |
| Example 9 | (3.0) LL | (28000 r) grade 4 | Grade 3 | Grade 1 |

It can be seen from the above experimental data that the preparation method provided by the present disclosure can effectively prepare a coating with high anti-slip performance and high wear resistance. It can be seen from the above data that the more uniform the sprayed bio-based organic polymer material, the better the anti-slip performance and wear resistance of the glove. In addition, when a fan frequency is 20 Hz, the performance of a coating formed by spraying the bio-based organic polymer material completely exceeds the performance of a coating formed by spraying the industrial salt.

It can be seen from the FIGURE that the coating prepared by the preparation method of the present disclosure has a relatively uniform pore size, and uniform bubble pores in the coating like suckers. When the rubber is in contact with a surface of an object, the rubber can allow an adsorption effect through large-area attachment to tiny protrusions on the surface of the object to form a vacuum space under an action of an atmospheric pressure, such that the suckers are closely attached to the object, which greatly improves a suction force and thus increases a grasping force of a coating. In addition, the biological compound enzyme in the formula system of the present disclosure can decompose the excess bio-based organic polymer material on a coating during a production process, such that only a high-strength film layer is retained on a surface of the coating to significantly improve the wear resistance of the coating.

The above are merely preferred examples of the present disclosure, but are not intended to limit the present disclosure. A person skilled in the art can make various modifications or equivalent replacements to the present disclosure within the spirit and protection scope of the present disclosure. These modifications or equivalent replacements shall be considered to fall within the protection scope of the technical solutions of the present disclosure.

What is claimed is:

1. A preparation method of a glove having a soft coating comprising: physically spraying a bio-based organic polymer material on a surface of a glove core coated with an impregnation latex to obtain a first treated glove core, conducting a pre-vulcanization and a vulcanization on the first treated glove core successively to obtain a second treated glove core, washing the second treated glove core with an alkali liquor, an acid liquor, and water successively to obtain a third treated glove core, and performing an oven-drying on the third treated glove core to obtain the glove having the soft coating.

2. The preparation method of the glove having the soft coating according to claim 1, wherein the bio-based organic polymer material is selected from one or a mixture of two or more of albumin, globulin, phosphoprotein, and casein; a particle size of the bio-based organic polymer material is less than 50 mesh; and a frequency of a fan for physically spraying the bio-based organic polymer material is 10 Hz to 30 Hz.

3. The preparation method of the glove having the soft coating according to claim 1, wherein the pre-vulcanization is conducted at 70° C. to 90° C. for 90 min, and the vulcanization is conducted at 110° C. to 140° C. for 90 min.

4. The preparation method of the glove having the soft coating according to claim 1, wherein the alkali liquor used for an alkali-washing is selected from one of a NaOH solution or a KOH solution, a mass fraction of the alkali liquor is 1% to 5%, and the alkali-washing is conducted for 45 min to 70 min; the acid liquor used for an acid-washing is an acetic acid solution with a mass fraction of 1% to 5%, and the acid-washing is conducted for 45 min to 70 min; after the acid-washing, a water-washing is conducted twice for 60 min each time; and the oven-drying is conducted at 90° C.

5. The preparation method of the glove having the soft coating according to claim 1, wherein the impregnation latex comprises the following raw materials in parts by weight: 70 parts to 100 parts of an acrylonitrile-butadiene latex, 15 parts to 20 parts of a styrene-butadiene latex, 7 parts to 10 parts of a waterborne polyurethane (PU), 0.5 parts to 0.8 parts of KOH, 1 part to 2 parts of a surfactant, 2 parts to 3 parts of a foaming agent, 1 part to 3 parts of sulfur, 2 parts to 4 parts of an accelerating agent, 1 part to 3 parts of zinc oxide, 1 part to 3 parts of titanium dioxide, 3 parts to 5 parts of a film-forming agent, 4 parts to 5 parts of an antioxidant, 7 parts to 10 parts of a crosslinking agent, 4 parts to 5 parts of a biological compound enzyme, 1 part to 3 parts of a black pigment, and 1 part to 4 parts of a thickening agent.

6. The preparation method of the glove having the soft coating according to claim 5, wherein the surfactant is selected from one of polyoxyethylene, polyoxypropylene, sodium tripolyphosphate, or sodium sulfate; the foaming agent is selected from one of an azo compound, a sulfonyl hydrazide, or a nitroso compound; the accelerating agent is selected from one of a thiazole accelerating agent, a sulfenamide accelerating agent, a thiuram accelerating agent, a dithiocarbamate accelerating agent, a guanidine accelerating agent, or a xanthate accelerating agent; the film-forming agent is selected from one of a polymer resin, an acrylic resin, or nitrocellulose; the antioxidant is selected from one of an amine antioxidant, a phenol antioxidant, or a heterocycle antioxidant; the crosslinking agent is selected from one of a phenolic resin, an epoxy resin, or polyvinyl alcohol; the biological compound enzyme is selected from one of amylase, protease, lipase, phytase, cellulase, or glucanase; and the thickening agent is selected from one of sodium carboxymethyl cellulose, propylene glycol alginate, sodium carboxymethyl starch, hydroxypropyl starch ether, sodium starch phosphate, acetylated distarch phosphate, phosphated distarch phosphate, or hydroxypropyl distarch phosphate.

7. The preparation method of the glove having the soft coating according to claim 1, wherein a preparation method of the glove core coated with the impregnation latex comprises:
S1, mixing and stirring raw materials for the impregnation latex to obtain the impregnation latex;
S2, sleeving a glove core on a hand mold, and preheating the glove core at 50° C. to 80° C.;
S3, impregnating the preheated glove core with a coagulating agent;
S4, after impregnating the preheated glove core with the coagulating agent for 60 s to 80 s, impregnating back, top, front, and bottom sides of the coagulating agent-impregnated glove core with the impregnation latex; and
S5, after impregnating the coagulating agent-impregnated glove core with the impregnation latex, spinning the impregnation latex-impregnated glove core for 50 s to 80 s.

8. The preparation method of the glove having the soft coating according to claim 7, wherein the coagulating agent is a mixed solution of acetic acid and methanol, and a volume fraction of the acetic acid in the mixed solution is 3% to 10%.

* * * * *